United States Patent

Hay et al.

[15] 3,683,037
[45] Aug. 8, 1972

[54] HYDROBROMINATION OF ALPHA-OLEFINS WITH PRIOR AIR-BLOWING

[72] Inventors: Russell G. Hay, Gibsonia; Clarence R. Murphy, Allison Park; William L. Walsh, Glenshaw, all of Pa.

[73] Assignee: Gulf Research & Development Company, Pittsburgh, Pa.

[22] Filed: Sept. 9, 1969

[21] Appl. No.: 856,374

[52] U.S. Cl. ................................................. 260/663
[51] Int. Cl. ............................................... C07c 17/08
[58] Field of Search ....................... 260/663, 683.15 D

[56] References Cited

UNITED STATES PATENTS

| | | |
|---|---|---|
| 3,422,145 | 1/1969 | Steinmetz .................. 260/663 |
| 3,482,000 | 12/1969 | Fernald et al..... 260/683.15 D |
| 3,471,562 | 10/1969 | Wakeman et al.......... 260/663 |
| 3,546,306 | 10/1970 | McCarthy .................. 260/663 |

*Primary Examiner*—Daniel D. Horwitz
*Attorney*—Meyer Neishloss, Deane E. Keith and Richard C. Gaffney

[57] ABSTRACT

A method is provided for the uniform activation of substantially pure alpha-olefins such as those prepared by the ethylene build-up procedure using catalysts such as $Al(Et)_3$. The olefin is activated by air-blowing at a temperature from 60° to 200° C. The activated olefin is thereafter reacted with anhydrous HBr to produce the desired primary alkyl bromide in the absence of an extraneously added catalyst at a temperature less than 50° C.

10 Claims, 1 Drawing Figure

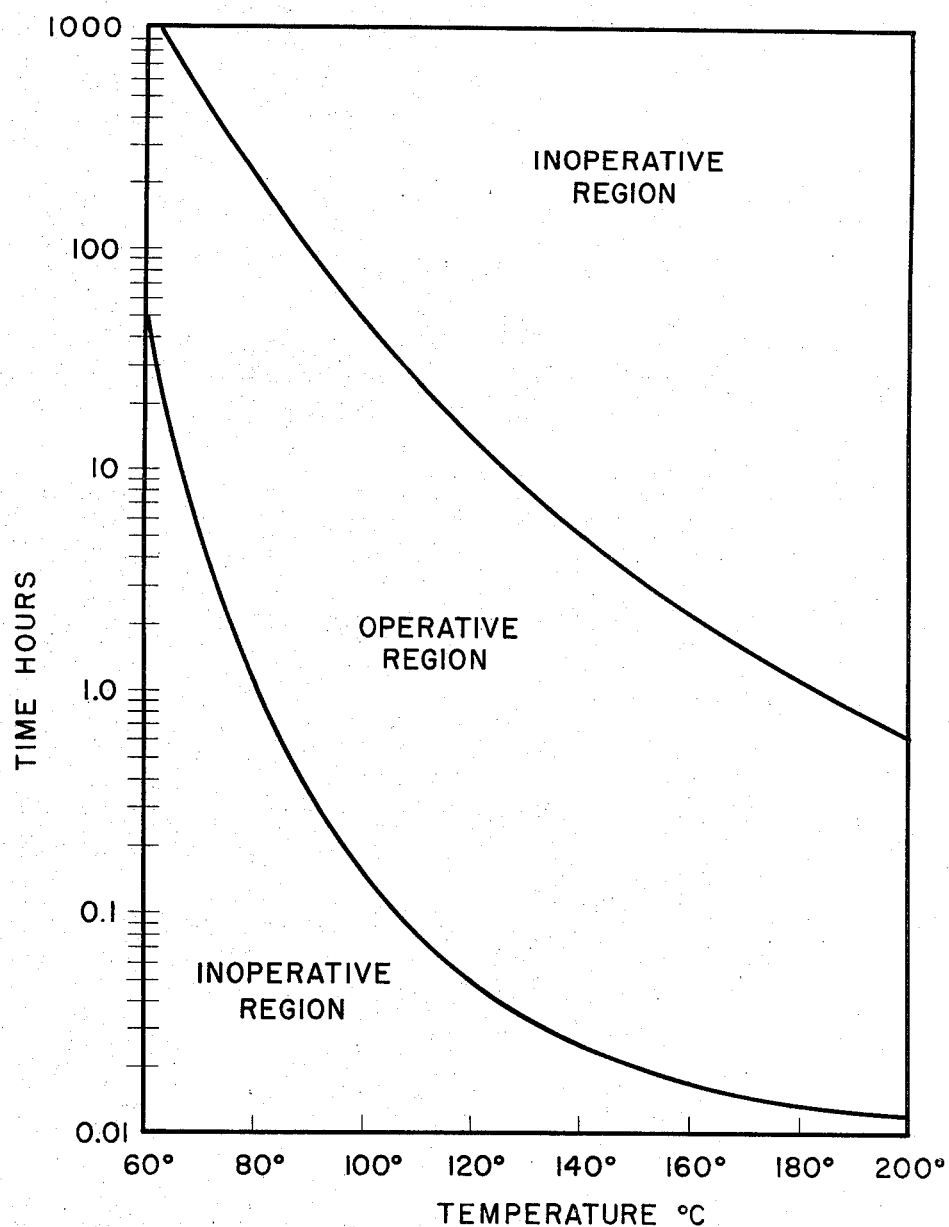
FIG. I
INVENTORS
RUSSELL G. HAY
BY CLARENCE R. MURPHY
WILLIAM L. WALSH

HYDROBROMINATION OF ALPHA-OLEFINS WITH PRIOR AIR-BLOWING

This invention relates to the preparation of primary alkyl bromides by the reaction of anhydrous HBr with a substantially pure alpha-olefin.

The addition of HBr to alpha-olefins to produce primary and secondary bromides is known. It is also known that primary alkyl bromides can be made by the addition of HBr to alpha-olefins in the simultaneous presence of free radical promoters, such as ultraviolet light (U.S. Pat. No. 2,307,532); extraneously added peroxides, such as organic peroxides (U.S. Pat. No. 2,058,466 and British Pat. No. 843,234); or air (U.S. Pat. No. 3,108,141). Other prior art appears to be contradictory (U.S. Pat. No. 3,336,403) in teaching the use of peroxidas is undesirable due to polymerization problems and further that the use of oxygen or air simultaneously with HBr is slow. Indeed, it has been found that in some instances the hydrobromination of alpha-olefins proceeded rapidly when air and HBr were simultaneously added while in other instances the reaction was unexplicably slow. It was found, however, that for a substantially pure olefin, that is, an olefin which contains no detectable amount of oxygen containing materials of any type, the reaction with HBr in the simultaneous presence of air was uniformly slow, thus the general teachings in U.S. Pat. 3,336,403. The simultaneous addition of air and HBr must be conducted at a temperature less than about 50° C., even in the presence of free radical promoters, if substantial amounts of secondary alkyl bromides are to be avoided. Thus, it was not possible to increase the temperature of the hydrobromination reaction in the simultaneous presence of air in order to speed up the slow reaction since, in so doing, substantial amounts of undesirable secondary bromides would result. It is for this reason that the prior art teaches the use of low temperature olefin activation, such as ultraviolet light; the addition of extraneous peroxides, such as organic peroxide; or the prior formation of ozonides. All of these methods suffer from the difficulty that they are expensive and not easily controlled.

A procedure to insure the uniform activation of a substantially pure alpha-olefin has now been found which is simple, easy to control, inexpensive and allows for the production of high yields of primary alkyl bromides without the need for an extraneously added free radical promoter.

In accordance with the invention, a primary alkyl bromide is prepared from a substantially pure alpha-olefin having from four to 30 carbon atoms by a process which comprises:

contacting at least one of said alpha-olefins with a gas containing free molecular oxygen at a temperature from about 60° to 200° C. for a time sufficient to result in activation of said olefin; and thereafter reacting said alpha-olefin with anhydrous HBr in the absence of an extraneously added catalyst at a temperature less than 50° C. to produce the desired alkyl bromide.

In one preferred embodiment of this invention the alpha-olefin charge stock is prepared by the telomerization of ethylene under telomerization conditions in the presence of a Group IIIA metal alkyl.

Unexpectedly, it was found that the substantially pure olefins could be activated by air-blowing at a temperature exceeding the normal hydrobromination reaction temperature in reasonable time periods without the subsequent formation of the unwanted sec-alkyl bromides.

The alpha-olefin charge stock can be any substantially pure alpha-olefin having from four to 30 carbon atoms per molecule and is preferably an alpha-olefin having from four to ten carbon atoms per molecule. The alpha-olefin can suitably have the formula:

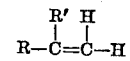

where R can be any hydrocarbon radical, preferably an alkyl radical, having from one to 28 carbon atoms and R' can be hydrogen or a saturated hydrocarbon radical having from one to 27 carbon atoms and wherein the sum of the carbon atoms in R and R' is from two to 28. Examples of suitable alpha-olefins include, but are not limited to:

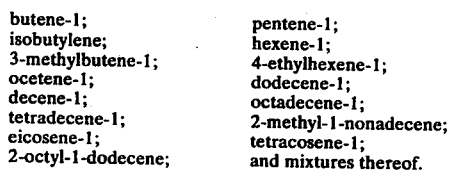

butene-1;
isobutylene;
3-methylbutene-1;
ocetene-1;
decene-1;
tetradecene-1;
eicosene-1;
2-octyl-1-dodecene;
pentene-1;
hexene-1;
4-ethylhexene-1;
dodecene-1;
octadecene-1;
2-methyl-1-nonadecene;
tetracosene-1;
and mixtures thereof.

While any of the above alpha-olefins can be used in the process of this invention to insure the production of primary alkyl bromides without the need of an extroneously added free radical catalyst, the process of this invention is particularly applicable to the hydrobromination of substantially pure alpha-olefins. By "substantially pure alpha-olefins" is meant those alpha-olefins which are prepared by the telomerization of a low molecular weight olefin having from two to six carbon atoms per molecule, such as ethylene, under telomerization conditions in the presence of a catalyst such as a Group IIIA metal alkyl such as defined below, for example, aluminum triethyl. Very pure olefins must be used in the telomerization process since the Group IIIA metal alkyls act as scavengers for any oxygen containing materials which might be present and reduce the efficiency of the telomerization reaction. Thus, the telomerization products which are obtained are substantially unreactive in the hydrobromination reaction as defined above. For example, the alpha-olefins freshly produced by the telomerization process result in a yield of less than 50 mole percent, usually less than ten mole percent, primary alkyl bromide when reacted with anhydrous hydrogen bromide in the absence of an extraneously added catalyst at −10° to 0° C. in a time of about two hours. Yet another way to obtain the substantially pure alpha-olefins would be, of course, to distill the alpha-olefins in the contact presence of a Group IIIA metal alkyl having at least one metal to carbon bond. By a "Group IIIA metal" is meant boron, aluminum, galium, indium and tellurium. By a "metal alkyl" is meant a metal alkyl wherein there is at least one metal to carbon bond, the carbon being a portion of an alkyl group. The metal alkyls can suitably have the formula:

where Me is any of the Group IIIA metals defined above and wherein at least one and preferably all of $R_2$, $R_3$ and $R_4$ are alkyl radicals having between one and ten carbon atoms and wherein any one or two of $R_2$, $R_3$ and $R_4$ can be selected from the group consisting of hydrogen and halogen radicals. Usually the metal alkyl is an aluminum or boron trialkyl such as triisobutylaluminum or triisobutylboron.

As noted, the substantially pure alpha-olefins prepared as above were found to be substantially inactive for the addition of HBr in the absence of an extraneously added free radical promoter. The simultaneous addition of oxygen in the form of air with the HBr to the alpha-olefins proved to be a very slow reaction requiring more than six hours at 28° C. to produce any appreciable amount of product.

It was found that the olefins could be simply and effectively activated by pretreatment before the HBr addition, the pretreatment consisting of contacting the alpha-olefin charge stock with a gas containing free molecular oxygen at a temperature between 60° C. and 200° C. for a time sufficient to activate the alpha-olefins. By an "activated olefin" is meant one which results in a yield of at least 85 mole percent primary alkyl bromide when reacted with anhydrous hydrogen bromide in the absence of an extraneously added catalyst at −10° to 0° C. in a reaction time of less than 15 minutes. Attempts were made to determine the peroxide number of the activated olefins and correlate activity with peroxide number, but such attempts failed since the peroxide numbers were inconsistent and active olefins had a peroxide number level so low that it was beyond the scope of the method. At temperatures below 60°C. the time required to activate the alpha-olefins is undesirably long. At temperatures above 200° C. the time is undesirably short. It has also been found that if the time at any given temperature is too long, then, for some unknown reason, the alpha-olefin is inoperable for the hydrobromination reaction either with or without the addition of an extraneously added free radical promoter. Thus, it has been found that the time and the temperature must be carefully correlated to result in an olefin which is active for the hydrobromination without the need for an extraneously added free radical promoter. Times as short as 1 minute or less are effective at the higher temperatures whereas times on the order of 6 hours are required at the lower temperatures. FIG. 1 attached is a plot on a semi-log scale of the time required vs. temperature to obtain an olefin in the Operative Region which is the region where an olefin would be active for the hydrobromination reaction without the need for an extraneously added free radical catalyst. The time in hours is on a semi-log scale. Thus, referring to FIG. 1, at 70° C. a minimum of 6 hours would be required to activate the alpha-olefin whereas at 170° C. about one minute is required. At 170° C., however, activation for more than 1-½ hours will result in an olefin which is inoperative in the process of this invention. Similarly, at 120° C. an activation time can be from about 3 minutes to about 11 hours, while at 200° C. the activation time is from about 0.5 seconds to about 36 minutes. It can easily be seen from FIG. 1 that the minimum activation times can vary over a wide range of several seconds at 200° C. to about 50 hours at 60° C. Since the hydrobromination reaction must be run at less than 60° C. to avoid the formation of undesired secondary bromides, it is quite apparent that the simultaneous addition of HBr and air to a substantially pure olefin would be so slow as to be considered unreactive. These conclusions have been substantiated experimentally.

The activation of the substantially pure alpha-olefins occurs quite simply by passage of a gas containing free molecular oxygen through the liquid alpha-olefin at the desired activation temperature. The term "air-blown" or "air-blowing" in this application refers to blowing with a gas containing free molecular oxygen which may be, but is not necessarily, air. Means should be provided for insuring intimate contact between the gas containing free molecular oxygen and liquid olefins to be activated. For example, the gas containing free molecular oxygen can be added to the liquid olefin through a sparger system which breaks up the gas into very small bubbles. While additional stirring is not required, it can be employed if desired. The gas containing free molecular oxygen can suitably be air, pure oxygen, or molecular oxygen diluted with an inert gas such as nitrogen. The gas suitably contains from 15 to 100 mole percent free molecular oxygen, and preferably from 15 to 40 mole percent free molecular oxygen. Amounts of oxygen in the activating gas less than about five mole percent would merely prolong the contact times necessary for activation as shown on FIG. 1. The preferred activating gas is, of course, air.

One of the factors to be considered in determining the proper activation temperature is, of course, the boiling point of the olefin charge stock. It is necessary for economic reasons to activate the olefin in the liquid phase, but it is also obvious that as the activation temperature increases the olefins tend to volatilize and some form of pressure equipment would be required in many instances to maintain the olefins in the liquid phase when using the higher activation temperatures. Thus, for the lower molecular weight olefins such as butenes and pentenes, it is necessary to utilize the lower activation temperatures which require more activation time in order to avoid the expense of resorting to high pressure equipment. For the higher molecular weight olefinic charge stocks which remain liquid even at the higher activation temperature ranges, it is possible, due to the unexpectedly short activation times required, to activate said olefinic charge stocks in the transfer line between the olefin production units or storage tank and the hydrobromination reactor, provided, of course, means are available for the intimate contacting of the olefinic charge stock in the transfer line with a gas containing free molecular oxygen. For purposes of better control, however, it is preferred that the activation temperature for all olefins be between 60° C. and 170° C., and more preferably between 70° C. and 150° C., for the olefins which are liquid at normal pressures in this temperature range. The activated olefin can then be charged to a hydrobromination reactor where it is contacted with anhydrous hydrogen bromide gas. The presence of moisture in the system in small quantities of about 1 percent or less is not harmful to the reaction, but moisture should be avoided as it may be harmful to the reaction equipment. The hydrogen bromide can be obtained from any suitable source, and how it is prepared or from whence it comes is not critical to the process of the subject invention.

The gaseous hydrogen bromide adds to the activated alpha-olefins in an anti-Markownikoff manner. Markownikoff stated in 1870 that if an unsymmetrical olefin is treated with hydrogen halide the addition will occur at the carbon-carbon double bond and that the hydrogen will attach itself to the carbon atom bearing the greater number of hydrogen atoms and that the halide would attach itself to the carbon atom bearing the least number of hydrogen atoms. Thus the normal or Markownikoff addition would produce a secondary alkyl bromide whereas the anti-Markownikoff addition produces the more desirable abnormal or anti-Markownikoff primary alkyl bromide.

The hydrogen bromide addition reaction occurs rapidly in any reactor providing for good mass transfer between the gaseous hydrogen bromide phase and the liquid alpha-olefin phase. For example, suitable mass transfer conditions for the addition of the hydrogen bromide to the olefin are obtained by bubbling the hydrogen bromide gas through the liquid activated olefin using, for example, a porous plate gas distributor to insure small gas bubbles resulting in a large interphase area. It is also preferred, of course, to provide vigorous agitation of the liquid phase to aid in the mass transfer and also to insure the maintenance of the desirable low reaction temperatures to be defined below. Under the excellent mass transfer conditions, the reaction is over in a matter of minutes even employing the low reaction temperatures to be defined below.

A suitable range of reaction temperatures is from −30° to 50° C., with the preferred reaction temperatures between −10° C. and 30° C. The use of increased reaction temperatures is undesirable as the higher temperatures promote the normal or Markownikoff addition with the consequent formation of the less desirable, less stable secondary alkyl bromides. When the reaction is operated in the defined temperature range, rapid completion of the hydrogen bromide addition occurs with the suppression of the formation of secondary alkyl bromides. Thus, suitable reaction times are between 1 and 240 minutes, and in the preferred temperature range the reaction times are usually between 3 and 120 minutes.

The reaction pressure can suitably be between atmospheric and 100 psig or more. An increase in reaction pressure tends to increase the reaction rate. However, since the reaction rate is already quite fast at atmospheric pressure, the use of increased reaction pressures, while technically feasible, is not preferred for obvious economic reasons.

The hydrobromination reaction product which is composed predominantly of primary alkyl bromides and small amounts of secondary alkyl bromides is usually purged of excess hydrogen bromide in any suitable manner. For example, nitrogen or helium can be passed or bubbled through the reaction product until free of hydrogen bromide. The resulting hydrogen bromide free alkyl bromide reaction product can then, optionally, be neutralized using any suitable basic solution, for example, a 5 percent aqueous solution of sodium bicarbonate is satisfactory and produces an upper organic phase and a lower aqueous phase. For some applications, for example, esterification reactions, neutralization is not required nor desired. The upper organic phase containing the alkyl bromides can then be separated and the alkyl bromide recovered in any suitable manner.

The crude alkyl bromide reaction product can also be recovered by purging with a non-reactive gas as described above and thereafter dissolving the alkyl bromide in about one to about ten times its volume of a non-reactive solvent for the alkyl bromide, such as chloroform or petroleum ether. The solution of the alkyl bromide in the solvent is then neutralized as before with a weakly basic solution. Alternatively, the unneutralized solution of the alkyl bromide in the non-reactive solvent can be washed with water until neutral, and this procedure is preferred in the case of the more labile alkyl bromides. Whichever method is chosen to neutralize, the neutralized solution is then dried in any conventional manner, such as by drying over magnesium sulfate. The solvent can then be removed by evaporation or distillation under reduced pressure. The pure alkyl bromide reaction product can then be distilled from the dried solvent-free organic phase. The invention will be further described with reference to the following experimental work.

Octene-1, which was prepared by the telomerization of ethylene, was distilled from tri-n-butylaluminum in a nitrogen atmosphere to produce a substantially pure octene-1. The peroxide number of the distilled octene-1 was less than 0.1, the limit of ASTM Test 1832.

A series of runs were made wherein the distilled octene-1 was air-blown at varying temperatures for varying times. The air-blown olefins were then contacted with anhydrous hydrogen bromide in the absence of an extraneously added catalyst at a temperature of −10° to 0° C. for varying times. The results of this series of runs are shown in Table I below.

Referring to Table I below, it can be seen that only the conditions of air-blowing in Example 3 gave an acceptable mole percent yield of primary alkyl bromide in a short length

TABLE I

| Ex. No. | Air-blowing conditions | | Hydrobromination Data | | |
|---|---|---|---|---|---|
| | Temp. °C. | Time hours | Reaction Time minutes | Primary Alkyl Bromide in product | |
| | | | | Mole % | Weight % |
| 1 | None | None | 120 | 8 | 13 |
| 2 | 70 | 2 | 103 | 24 | 35.2 |
| 3 | 70 | 6 | 6 | 95 | 97.1 |
| 4 | 25 | 2 | (a) | 4.6 | 5.6 |
| 5 | 27 | 6 | (a) | 29.7 | 42.2 |

(a) Hydrobromination was continued until reaction stopped.

of time. Note that from Example 1 a substantially pure olefin is one which results in a yield less than 10 mole percent primary alkyl bromide when reacted with anhydrous hydrogen bromide in the absence of an extraneously added catalyst at −10° to 0° C. in a time of about 2 hours. An active olefin would be one which gives at least an 85 mole percent yield of primary alkyl bromide when reacted with anhydrous hydrogen bromide in the absence of an extraneously added catalyst at −10° to 0° C. in a reaction time of less than 15 minutes. In this application, "yield" means the conversion of the olefin times the efficiency of conversion of the olefin to the desired primary alkyl bromide.

Another series of runs was made using substantially pure decene-1 to investigate the use of still higher temperatures for activating the decene-1 for hydrobromination. The decene-1 was prepared by the telomerization of ethylene and was distilled over tri-n-butylaluminum in a nitrogen atmosphere to obtain decene-1 which would be similar to fresh product obtained from a commercial plant producing alpha-olefins by the telomerization of ethylene using a metal alkyl catalyst such as triethylaluminum.

Air was blown through the decene-1 for varying times and temperatures and the air-blown decene-1 was then reacted with anhydrous hydrogen bromide at −10° to 0° C. for varying lengths of time by bubbling the hydrogen bromide through the cooled air-blown olefin. The results of this series of runs are shown in Table II below.

TABLE II

Activation of Alpha-Olefins for Hydrobromination by Air-Blowing - Decene-1 Examples

| | air-blowing conditions | | Hydrobromination Data | |
|---|---|---|---|---|
| Ex. No. | Time minutes | Temp. °C. | Reaction Time minutes | Primary Alkyl Bromide (Yield Wt. %) |
| 6 | None | — | 45.0 | 1.5 |
| 7 | 1 | 170 | 3.5 | 97.5 |
| 8 | 1 | 120 | 22.0 | 95.3 |
| 9 | 3 | 120 | 3.0 | 94.7 |
| 10 | 60 | 90 | 4.5 | 94.6 |

Example 6 shows that when no air-blowing is employed, only a 1.5 percent yield of primary alkyl bromide is obtained after a 45 minute reaction time at −10° to 0° C. Example 10 shows that at 90° C., a 60 minute air-blowing is sufficient to activate the olefin for the hydrobromination reaction since a yield of primary alkyl bromide of 94.6 is obtained in 4-½ minutes. Examples 7-9 show that at the higher air-blowing temperatures of 128° to 170° C. times of 1 to 3 minutes are sufficient to result in activation of the olefin for the hydrobromination reaction.

The experiments in Table II were performed by charging the decene-1(150 milliliters) to a 500 milliliter three-neck flask equipped with a stirrer, thermometer and a gas inlet tube. The flask was cooled to 0° to 5° C. with a dry ice acetone bath. The hydrogen bromide was introduced through a gas inlet tube. The hydrogen bromide consumption could be checked by the difference between the inlet and outlet gas bubbles.

Another series of runs were made wherein decene-1 was maintained at 170° C. and a slow stream of air was passed through so that the liquid was saturated with air. Samples (about 150 ml.) were taken at specific time intervals and the samples reacted with anhydrous hydrogen bromide at −10° to 0° C. to determine the relative reactivity with hydrogen bromide. The results are shown in Table III below.

TABLE III

Air-Blowing of Dcene-1 which was followed by hydrobromination of the treated Decene-1

| | air-blowing conditions | | primary $C_{10}$ | reaction time of |
|---|---|---|---|---|
| Ex. No. | Time hours | Temp. °C. | Br yield (Wt. %) | Hydrobromination (minutes) |
| 11 | 1/1 2 | 170 | 97.5 | 3.0 |
| 12 | 1/3 | 170 | 96.0 | 2.5 |
| 13 | 1 | 170 | 95.5 | 3.0 |
| 14 | 2 | 170 | 75.2 | 2.0 |
| 15 | 3 | 170 | 72.0 | 3.0 |
| 16 | 4 | 170 | 53.7 | 10.0 |
| 17 | 5 | 170 | 79.5 | 28.0 |
| 18 | 6 | 170 | 59.2 | 30.0 |
| 19 | 8 | 170 | 62.2 | 30.0 |
| 20 | 10 | 170 | 52.4 | 30.0 |
| 21 | 12 | 170 | 61.7 | 30.0 |

Referring to Table III, the results indicate that the reaction of decene-1 with air at 170° C. for 1 hour does not decrease the yield of primary decyl bromide. However, starting at the second hour of reaction with air, the yield of primary decyl bromide is reduced from 95-½ weight percent to 75.2 weight percent. At the 4 hour point, a 53.7 weight percent yield required 10 minutes instead of 3 minutes. The reaction with air caused the reaction time to increase to 30 minutes. These results in Table III indicate that although air-blowing is desirable, the reaction of decene-I with air at 170° C. for more than 1 hour is undesirable.

The results observed in Table III were quite unexpected. Once it was discovered that a substantially pure olefin could be activate by a simple air-blowing treatment, it was quite unexpected to find that the air-blowing treatment also causes deactivation of the olefin if too prolonged. Thus, the results in Tables I through III show that there are certain critical minimum reaction temperatures and times and certain critical maximum temperatures and times to obtain an olefin which is active for the hydrobromination reaction without the need for the addition of an extraneously added catalyst.

Yet another series of runs was made wherein decene-1 was distilled from 2.5 weight percent tri-n-butylaluminum in order to obtain an olefin which is similar to the olefin product obtained directly from a commercial unit producing olefins by the telomerization of ethylene using a metal alkyl catalyst such as triethylaluminum. The decene-1 was maintained a 110° C. and a slow stream of air was passed through so that the liquid was saturated with air. Samples (about 150 ml.) were taken at specific time intervals and the samples reacted with anhydrous hydrogen bromide at −10° to 0° C. to determine the relative activity with hydrogen bromide in a manner similar to the experiments in Example 14 above. The data from these samples are recorded in Table IV below.

Referring to Table IV below, it can be seen that in about 15 minutes the olefin is activated (compare Examples 22 and 24) while in 15 hours of air-blowing time, the yield of primary decyl bromide is greatly decreased (see Example 28) and the yield of secondary decyl bromide increased.

TABLE IV

| Ex. No. | air-blowing conditions Time hours | Temp. °C. | primary $C_{10}$ Br yield (Wt. %) | reaction time of Hydro-bromination (Minutes) |
|---|---|---|---|---|
| 22 | 0.0 | — | 5.5 | 30.0 |
| 23 | 0.5 | 110 | 97.5 | 3.5 |
| 24 | 1.0 | 110 | 98.3 | 3.5 |
| 25 | 3.0 | 110 | 98.2 | 5.0 |
| 26 | 6.0 | 110 | 98.2 | 2.5 |
| 27 | 9.0 | 110 | 95.8 | 6.0 |
| 28 | 15.0 | 110 | (36.5 Pri. Br/ 50.0 Sec. Br) | 30.0 |
| 29 | 18.0 | 110 | 89.3 Sec. Br | 30.0 |
| 30 | 21.0 | 110 | 86.3 Sec. Br | 30.0 |

When the last series of runs was repeated except the air-blowing temperature was 70° C., an air-blowing time of about 500 hours was required before the decene-1 was rendered unreactive.

The above examples illustrate the two step process of this invention where, in the first stage, the olefin is contacted with a gas containing free molecular oxygen at a temperature between 60°C. and 200°C. for a time sufficient to render the olefin active for the hydrobromination reaction. In the second stage the activated olefin is contacted with anhydrous hydrogen bromide which adds in an anti-Markownikoff fashion to produce the desired primary alkyl bromides. It is necessary to keep air out of the second stage reaction as much as possible because the presence of air in the second stage results in oxidation of the hydrogen bromide to bromine which can, in turn, cause the formation of alkyl dibromides and thus reduce the yield of desirable components.

Resort may be had to such variations and modifications as fall within the spirit of the invention and the scope of the appended claims.

We claim:

1. A process for preparing a primary alkyl bromide from a substantially pure alpha-olefin having from four to 30 carbon atoms per molecule which comprises:

contacting at least one of said alpha-olefins with a gas containing free molecular oxygen at a temperature from about 60° to 200° C. for a time sufficient to result in activation of said olefin; and thereafter reacting said alpha-olefin with anhydrous HBr in the absence of an extraneously added catalyst at a temperature less than 50° C. to produce the desired primary alkyl bromides.

2. A process for the preparation of a primary alkyl bromide from a substantially pure alpha-olefin having from four to 30 carbon atoms per molecule which comprises:

contacting at least one of said alpha-olefins with a gas containing free molecular oxygen under conditions including a temperature from 60° to 200° C. and a time from one minute to 500 hours;

thereafter reacting said alpha-olefin with anhydrous HBr in the absence of an extraneously added catalyst at a temperature less than 50° C. to produce the desired primary alkyl bromide;

the time and temperature in said activation step being such that the yield of primary alkyl bromide in said addition step is over 85 mole percent.

3. A process according to claim 1 wherein said alpha-olefin is one which has been intimately contacted with a Group IIIA metal alkyl having at least one carbon to metal bond.

4. A process according to claim 1 wherein the exact time and temperature conditions for said contacting are within the Operative Region as shown in FIG. 1.

5. A process in accordance with claim 1 wherein the substantially pure alpha-olefin is produced by:

telomerizing ethylene under telomerization conditions in the presence of a Group IIIA metal alkyl to produce a telomer product; and separating from said telomer product at least one olefin having from four to 30 carbon atoms.

6. A process according to claim 5 wherein the exact time and temperature conditions for said activation are within the Operative Region as shown on the FIG. 1.

7. A process according to claim 6 wherein the gas containing free molecular oxygen is air.

8. A process according to claim 7 wherein the alpha-olefin is octene-1.

9. A process according to claim 7 wherein the alpha-olefin is decene-1.

10. A process according to claim 5 wherein said metal alkyl is an aluminum alkyl.

* * * * *

UNITED STATES PATENT OFFICE
CERTIFICATE OF CORRECTION

Patent No. 3,683,037          Dated August 8, 1972

Inventor(s) Russell G. Hay, Clarence R. Murphy and William L. Walsh

It is certified that error appears in the above-identified patent and that said Letters Patent are hereby corrected as shown below:

Col. 9, Table IV should read:

TABLE IV

| Ex. No. | Air-Blowing Conditions | | Primary $C_{10}$ Br Yield (Wt.%) | Reaction Time of Hydrobromination (Minutes) |
|---|---|---|---|---|
| | Time Hours | Temperature °C. | | |
| 22 | 0.0 | -- | 5.5 | 30.0 |
| 23 | .25 | 110 | 97.5 | 3.5 |
| 24 | 1.0 | 110 | 98.3 | 3.5 |
| 25 | 3.0 | 110 | 98.2 | 5.0 |
| 26 | 6.0 | 110 | 98.2 | 2.5 |
| 27 | 9.0 | 110 | 95.8 | 6.0 |
| 28 | 15.0 | 110 | $\left(\frac{36.5 \text{ Pri.Br}}{50.0 \text{ Sec.Br}}\right)$ | 30.0 |
| 29 | 18.0 | 110 | 89.3 Sec.Br | 30.0 |
| 30 | 21.0 | 110 | 86.3 Sec.Br | 30.0 |

Signed and sealed this 30th day of January 1973.

(SEAL)
Attest:

EDWARD M. FLETCHER, JR.
Attesting Officer

ROBERT GOTTSCHALK
Commissioner of Patents